(12) United States Patent
Eade et al.

(10) Patent No.: US 6,563,285 B1
(45) Date of Patent: May 13, 2003

(54) STEPPER MOTOR CONTROL SYSTEM

(75) Inventors: Thomas Jon Eade, Lexington, KY (US); Randall David Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 25 days.

(21) Appl. No.: 09/888,558

(22) Filed: Jun. 25, 2001

(51) Int. Cl.[7] ................................................. H02P 8/34
(52) U.S. Cl. ................... 318/685; 318/696; 388/907.5
(58) Field of Search ................................. 318/685, 696, 318/254, 701; 388/907.5

(56) References Cited

U.S. PATENT DOCUMENTS

| | | | |
|---|---|---|---|
| 3,813,592 A | 5/1974 | Ryberg | |
| 3,986,094 A | * 10/1976 | Quioque et al. | ............ 318/696 |
| 4,072,888 A | 2/1978 | Bechtle et al. | |
| 4,489,260 A | 12/1984 | Matsushita | |
| 4,496,891 A | 1/1985 | Kobayashi | |
| 4,510,266 A | 4/1985 | Eertink | |
| 4,514,673 A | 4/1985 | Sfarti | |
| 4,586,808 A | 5/1986 | Tanimoto et al. | |
| 4,648,026 A | 3/1987 | Petrick | |
| 4,672,283 A | 6/1987 | Kobayashi | |
| 4,691,154 A | 9/1987 | Sato et al. | |
| 4,706,008 A | 11/1987 | Cronch et al. | |
| 4,714,867 A | 12/1987 | Palmin et al. | |
| 4,734,847 A | * 3/1988 | Hunter | ................... 318/696 X |
| 4,761,598 A | 8/1988 | Lovrenich | |
| 4,789,816 A | 12/1988 | Yamamoto et al. | |
| 4,817,007 A | 3/1989 | New | |
| 4,833,593 A | 5/1989 | Takeuchi et al. | |
| 4,901,000 A | 2/1990 | Center et al. | |
| 4,933,616 A | 6/1990 | Chang et al. | |
| 5,001,410 A | 3/1991 | Ono | |
| 5,015,937 A | 5/1991 | Wright et al. | |
| 5,078,518 A | * 1/1992 | Ono et al. | ................... 400/103 |
| 5,185,627 A | 2/1993 | Hartman | |
| 5,196,777 A | 3/1993 | Kataoka | |
| 5,198,741 A | 3/1993 | Shinada et al. | |
| 5,446,358 A | 8/1995 | Nakata | |
| 5,572,105 A | 11/1996 | Nojima et al. | |
| 5,574,351 A | 11/1996 | Jacobson et al. | |
| 5,663,624 A | 9/1997 | Callaway | |
| 5,703,455 A | 12/1997 | Miyazaki | |
| 5,804,941 A | 9/1998 | Ray | |
| 5,844,388 A | 12/1998 | Maiocchi | |
| 5,963,006 A | 10/1999 | Otani | |
| 6,124,696 A | * 9/2000 | Rademacher et al. | ........ 318/696 |
| 6,414,460 B1 | * 7/2002 | Li et al. | ...................... 318/685 |

OTHER PUBLICATIONS

IBM Technical Disclosure Bulletin 86A 61218 Dated May 1986 pp. 5599–5600 Titled Sequencing System for a Stepper Motor.

IBM Technical Disclosure Bulletin 86A 61772 Dated Aug. 1986 pp. 1039–1041 Titled "Microprocessor Control of Stepper Motor".

IBM Technical Disclosure Bulletin 80A 02635 Dated May 1980 pp. 5304–5306 Titled "Multimode Carriage Control".

IBM Technical Disclosure Bulletin 91A 60104 Dated Jan. 1991 pp. 280–281 Titled "Improved Forms Control Using DMA and Sensor Interrupts to Reduce Processor Bandwidth".

IBM Technical Disclosure Bulletin 75C 00968 Dated Apr. 1975 pp. 3390–3391 Titled "Programmable Stepper Motor Control".

(List continued on next page.)

Primary Examiner—Bentsu Ro
(74) Attorney, Agent, or Firm—Thompson Hine, LLP; Jacqueline Daspit, Esq.; Scott N. Barker, Esq.

(57) ABSTRACT

A method and system for controlling a stepper motor that may be used in a paper feed rolling arrangement of a printer. The method includes storing step mode selection data in combination with time data in a single table for retrieval and use by a controller.

20 Claims, 11 Drawing Sheets

OTHER PUBLICATIONS

IBM Technical Disclosure Bulletin 72C 01676 Dated Aug. 1972 pp. 930–931 Titled "Controlling a Stepper Motor Bidirectionally".

IBM Technical Disclosure Bulletin 84A 60410 Dated Feb. 1984 pp. 4846–4850 Titled "Stepper Motor Control Language".

IBM Technical Disclosure Bulletin 83A 61549 Dated Jul. 1983 pp. 710–713 Titled "Dual Stepper Motor Controller".

IBM Technical Disclosure Bulletin 82A 61992 Dated Dec. 1982 pp. 3635–3640 Titled "Method of Sequencing Stepper Motor Phases".

IBM Technical Disclosure Bulletin 84A 61684 Dated Jul. 1984 pp. 1030–1032 Titled "Time Independent Microcode".

IBM Technical Disclosure Bulletin 79A 07532 Dated Dec. 1979 pp. 2901–2902 Titled "Stepping Motor Control".

* cited by examiner

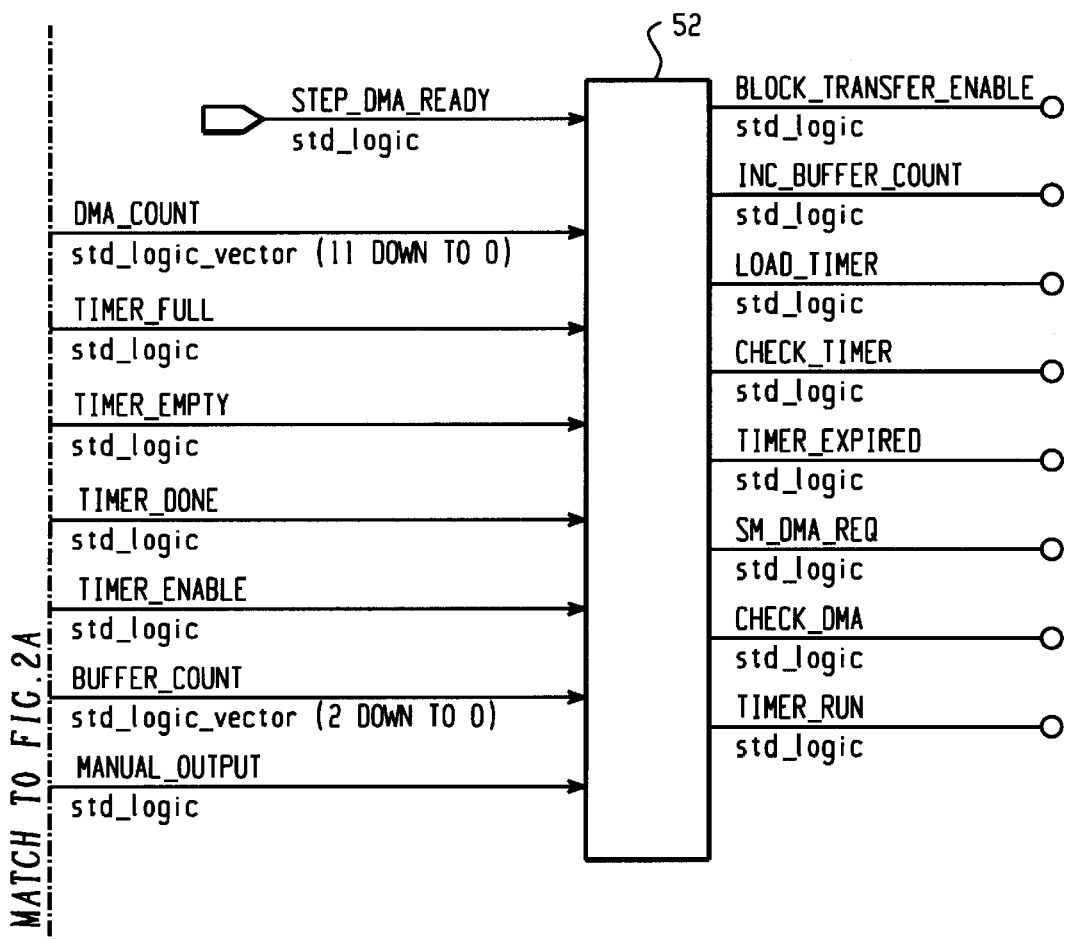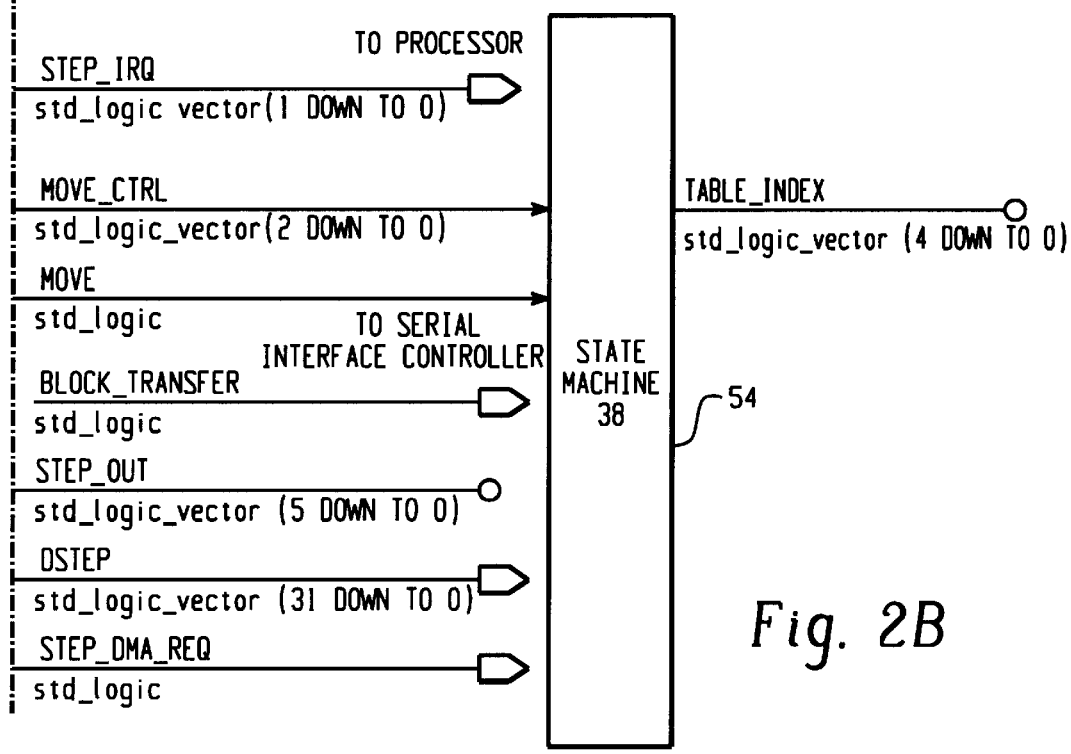
Fig. 2B

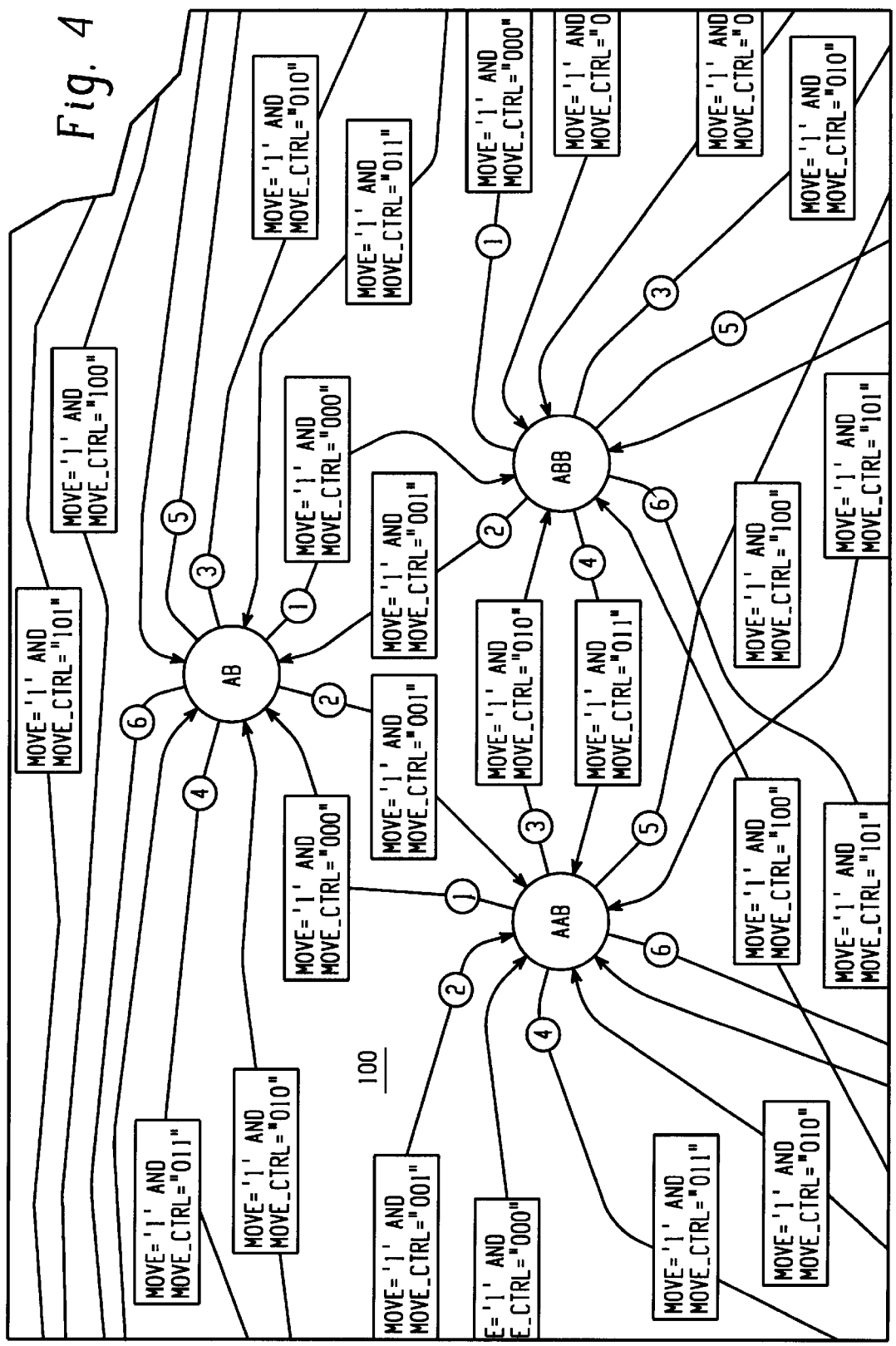

STEPPER MOTOR CONTROL SYSTEM

TECHNICAL FIELD

The present invention relates generally to stepper motor control systems for controlling the manner in which a stepper motor is energized and, more particularly, to a stepper motor control system and method in which step mode control data may be integrated into one or more entries of a stored table of time data.

BACKGROUND OF THE INVENTION

Stepper motors are commonly used in devices such as desktop printers for a variety of purposes, including the feed of paper through the printer and the movement of a print head carriage across a paper path. Control of such stepper motors to achieve desired print quality and speed continues to be a critical issue. Prior art stepper motor control systems that operate under microprocessor control are well known. Also known are systems that do not require microprocessor intervention. Both types of systems may commonly utilize both time tables (tables storing time data for defining the time between motor steps), energization tables (tables storing motor phase energization data), or combinations of the same.

For example, U.S. Pat. No. 3,986,094 discloses a stepper motor control system in which multiple stepper motor movement sequences are stored in ROM in the form of motor phase energization data and time data records or entries. To achieve a particular stepper motor movement, a ROM address is defined as a starting point and is loaded into a four bit counter associated with the ROM. Phase energization data and time data are output from the ROM location corresponding to the loaded address. The phase energization data is sent to the stepper motor drivers and the time data is loaded into a timer and a count is initiated. When the count is completed, the timer outputs a trigger signal which causes the four bit counter to increment by one, causing the entry in the next sequential address of ROM to be output. This sequence is continued until the end of the desired stepper motor movement is achieved, and no microprocessor intervention is required. In this system, numerous sets of phase energization and time data are stored in ROM, each set defining a given stepper motor movement operation.

U.S. Pat. No. 5,574,351 operates in a manner similar to U.S. Pat. No. 3,986,094. In particular, U.S. Pat. No. 5,574,351 discloses a stepper motor control system in which multiple step tables and multiple time tables (acceleration tables) are stored in memory. A first DMA channel is provided for accessing step table data and a second DMA channel is provided for accessing time table data. Time data retrieved from the time table is loaded into a timer and a count is initiated. At the conclusion of the count the timer generates a trigger signal which is sent to the DMA channel controllers causing next step data and time data to be sequentially retrieved via the DMA channels.

Neither U.S. Pat. No. 3,986,094 nor U.S. Pat. No. 5,574,351 discloses the storing of step mode control data in combination with time data in a single table. Accordingly, in such patents separate tables need to be provided for given stepper motor movement operations, resulting in decreased system flexibility.

Accordingly, it would be advantageous to provide an improved stepper motor control system.

SUMMARY OF THE INVENTION

In one aspect, a method for controlling a stepper motor involves: (a) storing a motor movement table having a plurality of entries, a multiplicity of said entries storing step mode selection data, time data, and energization table selection data; (b) providing at least two stored motor energization tables; (c) retrieving from said motor movement table a first entry; (d) initiating a count according to time data of the first entry; (e) after conclusion of the count of step (d), and based in part upon the step mode selection data of the first entry, establishing move control data for defining a desired next state; (f) based at least in part upon the move control data established in step (e), establishing an energization table index value corresponding to the desired next state; and (g) accessing a motor energization table corresponding to the table selection data of the first entry, and outputting from the accessed table motor energization control data corresponding to the energization table index value of step (f).

In another aspect, a method for controlling a stepper motor involves: (a) storing a motor movement table having a plurality of entries, a multiplicity of said entries storing step mode selection data, first time data, and second time data; (b) retrieving from said motor movement table a first entry; (c) initiating a first count according to the first time data of the first entry; (d) after the first count is concluded, and based in part upon the step mode selection data of the first entry, establishing first move control data indicative of a first desired next state; (e) based at least in part upon the first move control data, establishing a first table index value corresponding to the first desired next state; (f) accessing a motor energization table and outputting from the accessed table first motor energization control data corresponding to the first table index value; (g) after the first count is concluded, initiating a second count according to the second time data of the first entry; (h) after the second count is concluded, and based in part upon the step mode selection data of the first entry, establishing second move control data indicative of a second desired next state; (i) based at least in part upon the second move control data, establishing a second table index value corresponding to the second desired next state; (j) accessing the motor energization table and outputting from the accessed table second motor energization control data corresponding to the second table index value.

In a further aspect, a method for controlling a stepper involves: (a) storing a motor movement table having a plurality of entries, a multiplicity of said entries storing both first time data and second time data; (b) retrieving from said motor movement table a first entry; (c) initiating a first count according to the first time data of the first entry; (d) after the first count is concluded, outputting first motor energization control data; (e) after the first count is concluded, initiating a second count according to the second time date of the first entry; (f) after the second count is concluded, outputting second motor energization control data; (g) after step (b), determining whether the first time data represents a full count and, if so, skipping step (d).

In still a further aspect, a paper feed system for a printer includes a paper feed roller and a stepper motor operatively connected for effecting rotation of the paper feed roller. A stepper motor control system includes memory, a digital control block and a digital state machine. The memory stores a motor movement table having a plurality of entries, a multiplicity of the entries storing step mode selection data, first time data, second time data, detent control data, and energization table selection data. The digital control block includes a buffer for receiving a retrieved entry from the motor movement table, a counter for receiving time data from the retrieved entry in the buffer and initiating a count operation, and at least two motor energization tables stored in ASIC registers for outputting motor energization control data. The digital state machine outputs an energization table index value to the digital control block in a controlled manner. The digital control block includes an output for delivering, upon conclusion of the count operation, and based in part upon the step mode selection data and detent control data of the retrieved entry, move control data to the digital state machine for defining a desired next state, the move control data including step mode data and direction data. In response to receipt of the move control data the digital state machine outputs a next state index value to the digital control block. In response to receipt of the next state index value the digital control block accesses a motor energization table corresponding to the table selection data of the retrieved entry, and outputs motor energization control data corresponding to the next state table index value.

In another aspect, a paper feed system for a printer includes a paper feed roller and a stepper motor operatively connected for effecting rotation of the paper feed roller. A stepper motor control system includes memory and a controller. The memory stores a motor movement table having a plurality of entries, a multiplicity of said entries storing at least step mode selection data, time data, detent control data, and energization table selection data. The controller is operable to access the motor movement table and initiate a count based upon the time data of a retrieved entry. The controller is further operable upon completion of the count to establish an energization table index value based at least in part on the step mode selection data of the retrieved entry. The controller is also operable to access an energization table corresponding to the energization table selection data of the retrieved entry. The controller outputs motor energization control data from the accessed energization table in accordance with the energization table index value.

BRIEF DESCRIPTION OF THE DRAWINGS

FIGS. 2A and 2B are schematic diagram of one embodiment of a digital ASIC implementation of the control system of FIG. 1;

FIGS. 4 is partial state diagram for another control block of FIG. 2;

DETAILED DESCRIPTION

Figure 1:
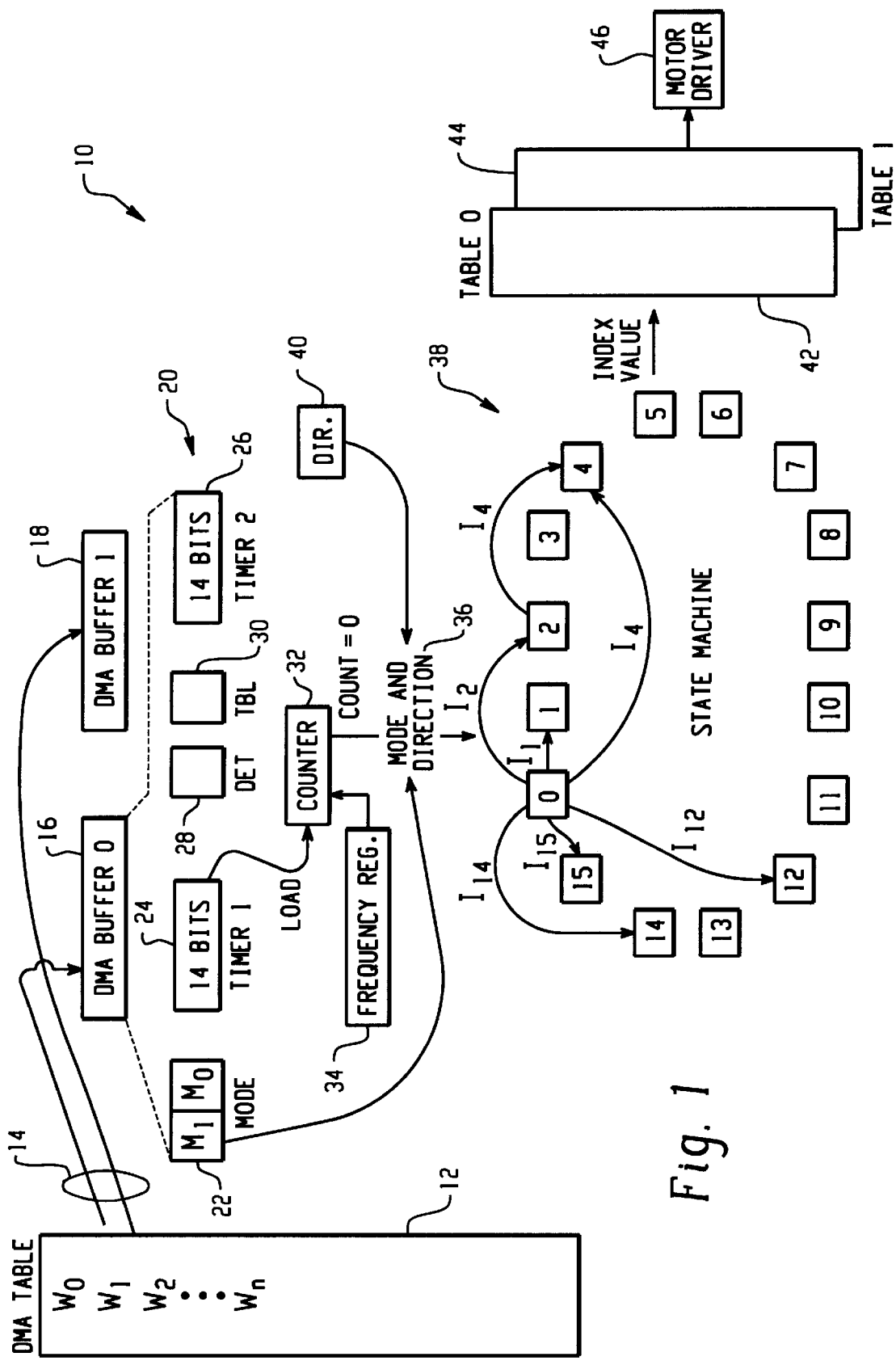
FIG. 1 is a schematic diagram of one embodiment of a stepper motor control system.

Referring to FIG. 1, a schematic diagram of one embodiment of a stepper motor control system 10 is shown. A motor movement table 12 is stored in memory of the control system. In the illustrated embodiment, a single DMA channel 14 provides direct memory access to the table. Entries retrieved from the motor movement table 12 can be directed to either DMA buffer 16 or DMA buffer 18. In the illustrated embodiment each entry of the motor movement table 12 may be formed by a 32 bit word ($w_0$–$w_n$) the contents of which are shown at 20. Two bits 22 represent step mode selection data that is used to control the stepping mode of the motor. The two mode selection bits 22 may, for example, be used to define 4 operating or stepping modes as set forth in Table I below.

TABLE I

| OPERATING MODE DESIGNATIONS | | |
|---|---|---|
| $M_1$ | $M_0$ | Stepping Mode |
| 0 | 0 | Quarter Step |
| 0 | 1 | Half Step |
| 1 | 0 | Full Step |
| 1 | 1 | No Step |

A fourteen bit segment 24 of word 20 stores first time data and a fourteen bit segment 26 stores second time data. Detent control bit 28 and table selection bits 30 are also provided in each word or entry of the table 12.

In stepper motor operation, sequential entries of the motor movement table 12 are loaded into respective buffers 16 and 18. The first time data 24 of the entry in buffer 16 is loaded into a counter 32 and a count is initiated. Counter 32 may, for example, be a down counter with frequency register 34 containing data which controls the frequency or time per count (time/count) of the down count. When the count of counter 32 is completed, in this embodiment reaching zero (COUNT=0), move control data in the form of mode and direction data 36 are established and output to a state machine 38. The move control data determines a next desired state and may be established as a combination of the move control data 22 and direction data that may be stored in a separate register location 40. The direction data may be a single bit, with zero (0) representing forward and one (1) representing reverse. Based upon the move control data (mode and direction data 36), in combination with a known previous state, the state machine 38 establishes an index value corresponding to the next desired state. In particular, the illustrated state machine includes 16 different states (0–15). From a given state such as state zero (0), six possible state changes are possible including: a change to state one (1) which is defined as a quarter-step forward, a change to state two (2) which is defined as a half step forward, a change to state four (4) which is defined as a full step forward, a change to state fifteen (15) which is defined as a quarter step in reverse, a change to state fourteen (14) which is defined as a half step in reverse, and a change to state twelve (12) which is defined as a full step in reverse. Depending upon the state change called for according to the move control data 36, the state machine 38 outputs an index value ($I_1$, $I_2$, $I_4$, $I_{15}$, $I_{14}$, $I_{12}$) corresponding to the next desired state which may be used for accessing and retrieving data from a motor energization table such as table 42 or table 44, or from a detent table. The motor energization tables 42, 44 store records or entries that define phase energization state and current magnitude for the stepper motor phases. The index value output by the state machine 38 defines the particular record or entry of a given table 42, 44, that should be output to the stepper motor driver 46 for a next step. In the illustrated embodiment the table selection data 30 of the record 20 retrieved from the motor movement table 12 defines the table 42 or 44 from which energization data is to be retrieved, or if the detent control bit 28 is set a detent table is used.

Referring again to counter 32, when the count corresponding to loaded time data 24 reaches zero (COUNT=0), second time data 26 of entry 20 is then loaded into counter 32 and a further or next count operation is initiated. When the further count operation reaches zero, the mode and direction data 36 is again passed to the state machine 38 to establish another index value for retrieving motor energization data from one of the tables. By way of example, if the mode defining data 22 defines a half step mode (01) and the direction data 40 defines a forward move, at the conclusion of the first count corresponding to first time data 24, and assuming an initial state of state zero (0) in state machine 38, the move control data 36 is transferred to the state machine 38 and the state machine responsively outputs index value $I_2$. The index value $I_2$ is then used to identify and output motor energization control data from one of the tables 42, 44 to the stepper motor driver 46. At the conclusion of the second count corresponding to second time data 26, the move control data is transferred to the state machine 38 and the state machine responsively outputs index value $I_4$. The index value $I_4$ is then used to identify and output motor energization control data from one of the tables 42, 44 to the stepper motor driver 46.

At the conclusion of the second count corresponding to time data 26, the first time data from the next entry located in DMA buffer 18 is loaded into the counter 32 and the control sequence proceeds using the mode data, first time data, detent data, table data, and second time data of the entry of buffer 18. At the same time a next entry from the motor movement table 12 may be retrieved and loaded into DMA buffer 16, overwriting the previous entry contained therein. This control sequence may continue until the last entry of the motor movement table has been retrieved and utilized.

In normal operation each piece of time data in an entry is used to initiate a count operation and at the conclusion of each count operation of counter 32 move control data 36 is sent to state machine 38, an index value is established by the state machine 38, the index value is used to identify and output motor energization data from a table 42, 44 to the stepper motor driver 46. In certain circumstances it may be desirable to alter this operation.

For example, where it is desired to move the stepper motor by an odd number of steps, at least one of the two pieces of time data 24, 26 in a given entry 20 will not be used. In this regard, a time data empty check operation may be performed on each piece of time data when it is loaded into the counter 32. If the time data is a zero or empty count (all binary 0's), then the count operation of counter 32 is not initiated and move control data 36 will not be sent to the state machine 38, resulting in no index value being produced and no motor energization control data being sent to the stepper motor driver 46. Instead, the next piece of time data is immediately loaded into the counter 32 and normal operation proceeds. In this manner, a piece of time data and its associated step operation are effectively skipped, and an odd number of steps may be achieved.

As another example, in certain operating circumstances the size limitation of the time data (14 bits) may not be large enough to achieve a desired time delay between motor steps. In this regard, a time data full check operation may be performed on each piece of time data when it is loaded into the counter 32. If the time data is a full count (all binary 1's) then the count operation of the counter 32 is initiated per normal procedure. At the conclusion of the count, however, rather than sending move control data 36 to the state machine 38 and producing an index value from the state machine 38, these steps are skipped and the next piece of time data is loaded into the counter 32 for initiation of a next count operation. Assuming the next piece of time data is not also a full count, at the conclusion of the next count operation move control data 36 is sent to the state machine 38 per normal procedure to produce an index value which is used to output motor energization data from a table 42, 44 to the stepper motor. In this manner, no step is taken after the conclusion of a count which is a full count, enabling the time between motor steps to be extended beyond the limit set by the limited size (14 bits) of the time data segments 24, 26.

It is recognized that in a given system both the time data empty check operation and the time data full check operation may take place relative to each piece of time data of a given motor movement table entry, and such checks could be performed before or after the data is loaded into the counter 32.

Figure 2A:
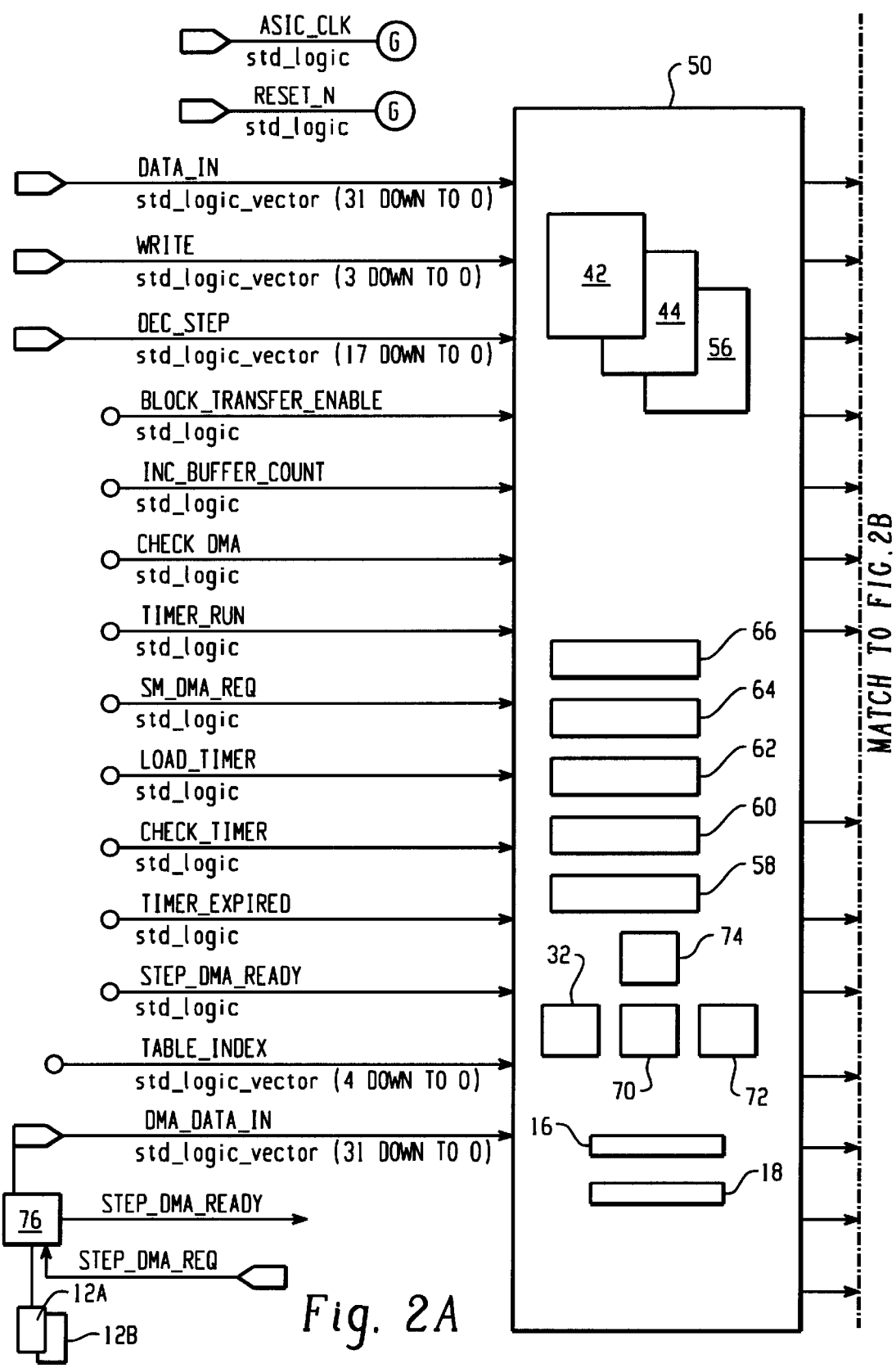

Referring now to FIG. 2, one implementation of the control system embodiment 10 shown in FIG. 1 is described. Control blocks 50, 52, and 54 may be implemented in digital ASIC form, with control block 50 representing the primary control block, control block 52 representing a secondary control block, and control block 54 representing the index value producing state machine 38 of the system. The inputs and outputs of the control blocks are shown on the input and output lines of each control block. A summary definition of each input and output is provided at the end of this specification.

Referring to control block 50, this block includes the motor energization tables 42 and 44 and in addition may include motor energization table 56 that represents a detent table. Ten 32 bit digital ASIC registers may form the tables. By way of example, the registers identified in tables IIA–IIJ below might be used.

TABLE II-A
PHASEREGISTER1

| Bit | POR | Description | Operation |
|---|---|---|---|
| 5:0 | 0b011011 | Table 0 AB Full Current | Read/Write |
| 11:6 | 0b001101 | Table 0 ABB Full Current | ReadlWrite |
| 17:12 | 0b001110 | Table 0 B Full Current | Read/Write |
| 23:18 | 0b001100 | Table 0 CBB Full Current | Rea/Write |
| 29:24 | 0b011010 | Table 0 CB Full Current | Read/Write |
| 31:30 | 0b00 | not used | Read Only |

TABLE II-B
PHASEREGISTER2

| Bit | POR | Description | Operation |
|---|---|---|---|
| 5:0 | 0b101000 | Table 0 CCB Full Current | Read/Write |
| 11:6 | 0b110000 | Table 0 C Full Current | Read/Write |
| 17:12 | 0b100000 | Table 0 CCD Full Current | Read/Write |
| 23:18 | 0b010010 | Table 0 CD Full Current | Read/Write |
| 29:24 | 0b000100 | Table 0 CDD Full Current | Read/Write |
| 31:30 | 0b00 | not used | Read Only |

TABLE II-C
PHASEREGISTER3

| Bit | POR | Description | Operation |
|---|---|---|---|
| 5:0 | 0b000111 | Table 0 D Full Current | Read/Write |
| 11:6 | 0b000101 | Table 0 ADD Full Current | Read/Write |
| 17:12 | 0b010011 | Table 0 AD Full Current | Read/Write |
| 23:18 | 0b100001 | Table 0 AAD Full Current | Read/Write |
| 29:24 | 0b111001 | Table 0 A Full Current | Read/Write |
| 31:30 | 0b00 | not used | Read Only |

TABLE II-D
PHASEREGISTER4

| Bit | POR | Description | Operation |
|---|---|---|---|
| 5:0 | 0b001001 | Table 1 AB Full Current | Read/Write |
| 11:6 | 0b001101 | Table 1 ABB Full Current | Read/Write |
| 17:12 | 0b001110 | Table 1 B Full Current | Read/Write |

-continued

| | | | |
|---|---|---|---|
| 23:18 | 0b001100 | Table 1 CBB Full Current | Read/Write |
| 29:24 | 0b001000 | Table 1 CB Full Current | Read/Write |
| 31:30 | 0b00 | not used | Read Only |

TABLE II-E
PHASEREGISTER5

| Bit | POR | Description | Operation |
|---|---|---|---|
| 5:0 | 0b101000 | Table 1 CCB Full Current | Read/Write |
| 11:6 | 0b110000 | Table 1 C Full Current | Read/Write |
| 17:12 | 0b100000 | Table 1 CCD Full Current | Read/Write |
| 23:18 | 0b000000 | Table 1 CD Full Current | Read/Write |
| 29:24 | 0b000100 | Table 1 CDD Full Current | Read/Write |
| 31:30 | 0b00 | not used | Read Only |

TABLE II-F
PHASEREGISTER6

| Bit | POR | Description | Operation |
|---|---|---|---|
| 5:0 | 0b000111 | Table 1 D Full Current | Read/Write |
| 11:6 | 0b000101 | Table 1 ADD Full Current | Read/Write |
| 17:12 | 0b000001 | Table 1 AD Full Current | Read/Write |
| 23:18 | 0b100001 | Table 1 AAD Full Current | Read/Write |
| 29:24 | 0b111001 | Table 1 A Full Current | Read/Write |
| 31:30 | 0b00 | not used | Read Only |

TABLE II-G
PHASEREGISTER7

| Bit | POR | Description | Operation |
|---|---|---|---|
| 5:0 | 0b101101 | AB Detent Current | Read/Write |
| 11:6 | 0b101101 | ABB Detent Current | Read/Write |
| 17:12 | 0b101110 | B Detent Current | Read/Write |
| 23:18 | 0b101110 | CBB Detent Current | Read/Write |
| 29:24 | 0b101100 | CB Detent Current | Read/Write |
| 31:30 | 0b00 | not used | Read Only |

TABLE II-H
PHASEREGISTER8

| Bit | POR | Description | Operation |
|---|---|---|---|
| 5:0 | 0b101100 | CCB Detent Current | Read/Write |
| 11:6 | 0b110100 | C Detent Current | Read/Write |
| 17:12 | 0b110100 | CCD Detent Current | Read/Write |
| 23:18 | 0b100100 | CD Detent Current | Read/Write |
| 29:24 | 0b100100 | CDD Detent Current | Read/Write |
| 31:30 | 0b00 | not used | Read Only |

TABLE II-I
PHASEREGISTER9

| Bit | POR | Description | Operation |
|---|---|---|---|
| 5:0 | 0b100111 | D Detent Current | Read/Write |
| 11:6 | 0b100111 | ADD Detent Current | Read/Write |
| 17:12 | 0b100101 | AD Detent Current | Read/Write |
| 23:18 | 0b100101 | AAD Detent Current | Read/Write |
| 29:24 | 0b111101 | A Detent Current | Read/Write |
| 31:30 | 0b00 | not used | Read Only |

TABLE II-J
PHASEREGISTER10

| Bit | POR | Description | Operation |
|---|---|---|---|
| 5:0 | 0b111101 | AAB Detent Current | Read/Write |
| 11:6 | 0b101001 | Table 1 AAB Full Current | Read/Write |
| 17:12 | 0b101001 | Table 0 AAB Full Current | Read/Write |
| 31:18 | 0x0000 | not used | Read Only |

In such tables, the Bit column defines the bit segment of the register, the POR column identifies the state of each bit in the bit segment, the Description column describes the motor phase and current state defined by the given bit segment, and the Operation column indicates the Read/Write status of the given bit segment. In the registers shown in tables II-A through II-J, 6 bit segments are used to identify a given phase state and current level. For example, referring to phaseregister1 of Table II-A, the bit segment defined by bits 5:0 store motor energization data which represents phase state AB at full current for table 42 (Table 0). Likewise, bits 11:6 store motor energization data for phase state ABB full current, bits 17:12 store motor energization data for phase state B full current, bits 23:18 store motor energization data for state CBB full current, and bits 29:24 store motor energization data for phase state CB full current. Bits 30 and 31 of phaseregister1 are not used. Each utilized bit segment of phaseregister1 is both read and write enabled, so that data from the bit segment can be output and so that data in the bit segment can be changed via processor input if desired. Phaseregister2 and phaseregister3 of tables II-B and II-C store the remaining motorenergization data for table 42. Phaseregister4, phaseregister5, and phaseregister6 of Tables II-D, II-E, and II-F store motor energization data for table 44, while phaseregister7, phaseregister8, phaseregister9, and phaseregister10 of Tables II-G, II-H, II-I, and II-J store motor energization data for detent table 56. Also stored in phaseregister10 are an additional entry for table 42 (Table 0 AAB Full Current) and an additional entry for table 44 (Table 1 AAB Full Current).

Control block 50 also contains registers which define DMA buffers 16 and 18 for receiving data retrieved from entries in motor movement table 12A or 12B, which are stored in memory, as well as counter 32 for receiving the time data from the buffers 16 and 18. Additional registers which may be provided in control block 50 include a step timer base register 58, a step count base register 60, a step control register 62, a step DMA count register 64, and a step interrupt count register 66.

The step timer base register 58 holds a base value for the stepper motor timer and a value for a serial interface-blocking function. In particular, bits 5:0 of this register 58 contain base timer data used to control the operating frequency of the clock that runs the main timer for the motor control. In other words, these six bits define the number of system clock cycles that should transpire to yield a change in the value of counter 32 (corresponding to the frequency register 34 of FIG. 1). In one embodiment the time per count may be 20.833 nanoseconds, but many variations are possible. Bits 12:8 of register 58 store a serial interface signal blocking value which is used to trigger a BLOCK_TRANSFER output signal to a serial interface controller for blocking transfers on an analog ASIC serial interface in anticipation of a transition to a new set of motor energization control data at STEP_OUT which is delivered over the analog ASIC serial interface. Transitions on the serial interface are held off when the main timer value (counter 32) is less than the interface signal blocking value (bits 12:8 of register 58). Bits 5:0 and bits 12:8 may all be both read and write enabled. Bits 7:6 and bits 31:13 of the register 58 may be unused.

The step count base register 60 holds base values for both a step counter 70 and a repeat counter 72 of the control block 50. For example, bits 15:0 may contain the base value for comparison with the step counter 70 and bits 31:16 may contain the base value for the repeat counter 72. The step counter base value is used to control transition to a repeat mode. In normal operation the control block 50 fetches a DMA word from one of tables 12A, 12B every other motor step. Each DMA word contains two timer values as previously described, and the control block 50 contains two DMA word buffers 16 and 18 that are alternatingly filled. The control block 50 monitors the number of steps taken by the motor, as reflected by the step counter 70, and compares the step counter value to the step counter base value in register 60. When the actual step count equals the step counter base value, the control block 50 begins to repeat the current value in the main timer (counter 32) and suspends DMA retrieval operations. The repeat count base value in register 60 controls the number of times the then current time value is repeated before resuming DMA operations. Bits 16 to 31 report the current value of the repeat count when read, NOT the base value. The repeat count may be updated while the system is repeating a timer. Writing the repeat count while repeating results in a load to the upper 14 bits of the repeat counter 72. The repeat operation ceases when the repeat count from counter 72 decrements to zero. If a new non-zero count is loaded after the repeat has finished with the motor still running, the repeat operation resumes with the new repeat count value. When the repeat operation ceases, DMA retrieval operations are resumed.

The step control register 62 holds the control bits for operation of the step motor. Bit 0 is the main on-off switch for the controller which is made up primarily of blocks 50, 52 and 54. When bit 0 is set to zero, the automatic operation of controller is off. If the controller is disabled during operation, the current count operation of counter 32 will continue to count, a step is taken after the count expires, and the motor control data is sent to the state machine 38 to define the index value (TABLE-INDEX) for outputting motor energization control data from one of tables 42, 44 and 56. The motor outputs remain in this last step state until the counter is restarted or a manual output mode is enabled. When bit 0 is set high, the controller begins automatic operation. The controller initiates a DMA transfer and starts the counter 32 with the first value retrieved via the DMA channel. Any time data values in the buffers 16 and 18 from previous moves are overwritten by the new DMA data before the controller starts. Bit 1 of register 62 controls the direction of the motor (corresponding to 40 in FIG. 1). Bit 2 is a read-only observation bit to indicate if the controller 10 is currently repeating a timer value. Bit 3 is a manual operation control bit. If bit 3 is set high, the automatic controller outputs are blocked and manual output data in bits 13 through 8 (13:8) of register 62 is sent to the motor at the output STEP-OUT. In this mode, the timer or counter 32 does not run and the output states are controlled by software of a processor used to write data to the control block registers via inputs DATA_IN, WRITE and DEC_STEP. Bits 31 through 16 (31:16) of register 62 contain the value of the step count. This is the total step count since main timer enable control (bit 0) was set. This counter does not increment when the controller enters or leaves a detent state. Bits 0, 1, 3, and 8–13 of this register 62 may be both read and write enabled. Bits 7:4 and 15:14 of register 62 may be unused The step DMA count register 64 contains a twelve bit count value for DMA access control (bits 11:0). The control block 50 loads this count into a counter 74 at the beginning of a move operation. The counter 74 decrements each time a DMA retrieval operation from one of tables 12A, 12B takes place. When the count of counter 74 reaches zero, the DMA operations cease and an interrupt is generated at STEP_IRQ. The control block 50 continues to use the currently loaded time value of counter 32 until the main timer enable (bit 0 of register 62) is cleared. Register 64 also contains an observation of the timer buffer count (bits 13:12) and the current count in main counter 32 (bits 29:16).

The step interrupt count register 66 contains a step count value (bits 15:0) for a step count interrupt source. This step count value is compared to the current step count in step counter 70 and an interrupt is generated at STEP_IRQ when the value in the step counter 70 is equal to the step count value. This interrupt cannot be re-armed until the step count is reset by clearing the main timer enable control bit (bit 0 of register 62). Register 66 also contains observation of the phase table pointer which identifies the last motor energization control data segment retrieved from table 42 or 44 (bits 21:16) and observation of the motor output signals at STEP-OUT (bits 29:24).

Figure 3A:
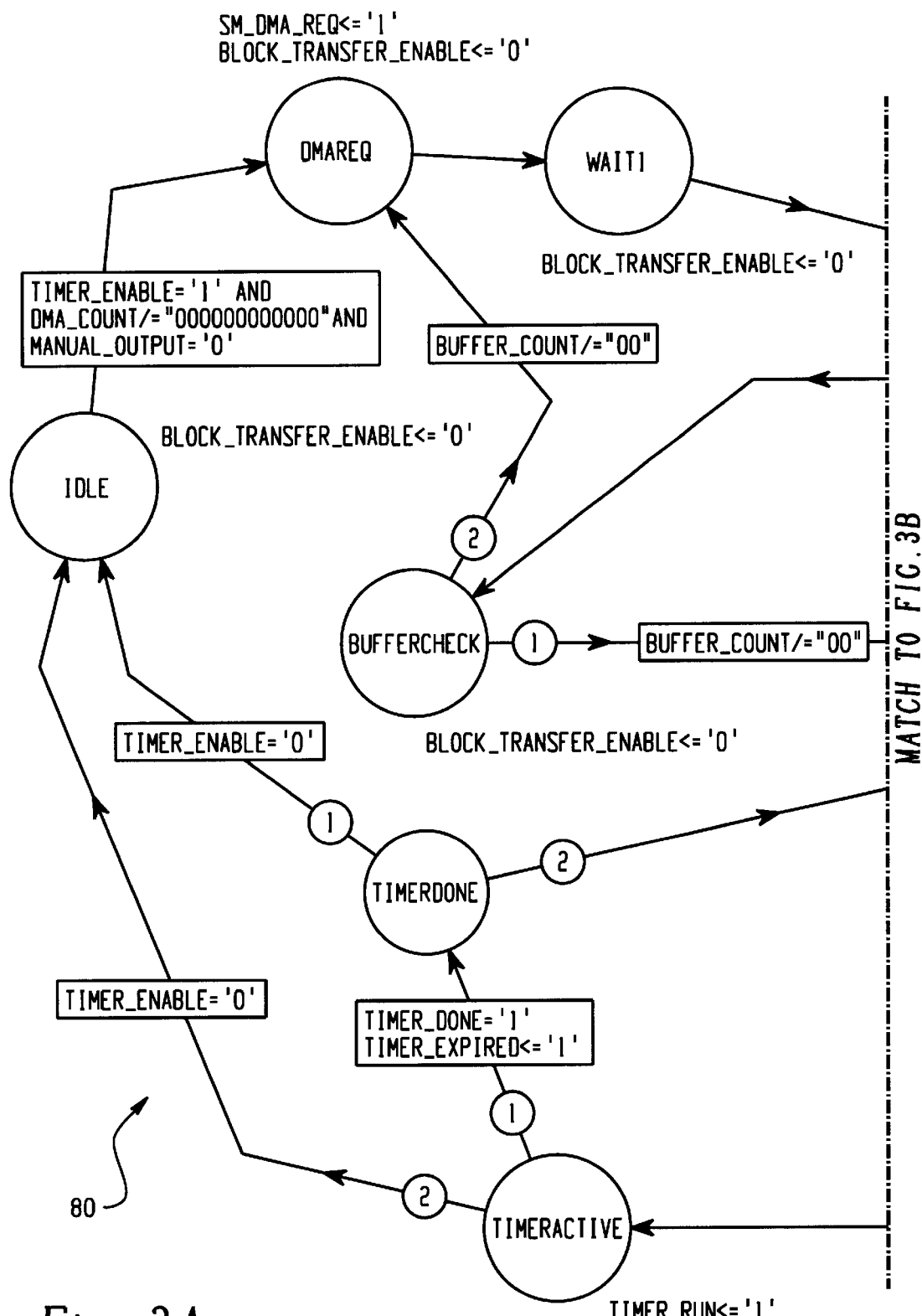
FIGS. 3A and 3B are a state diagram for a control block of FIG. 2.
Figure 3B:
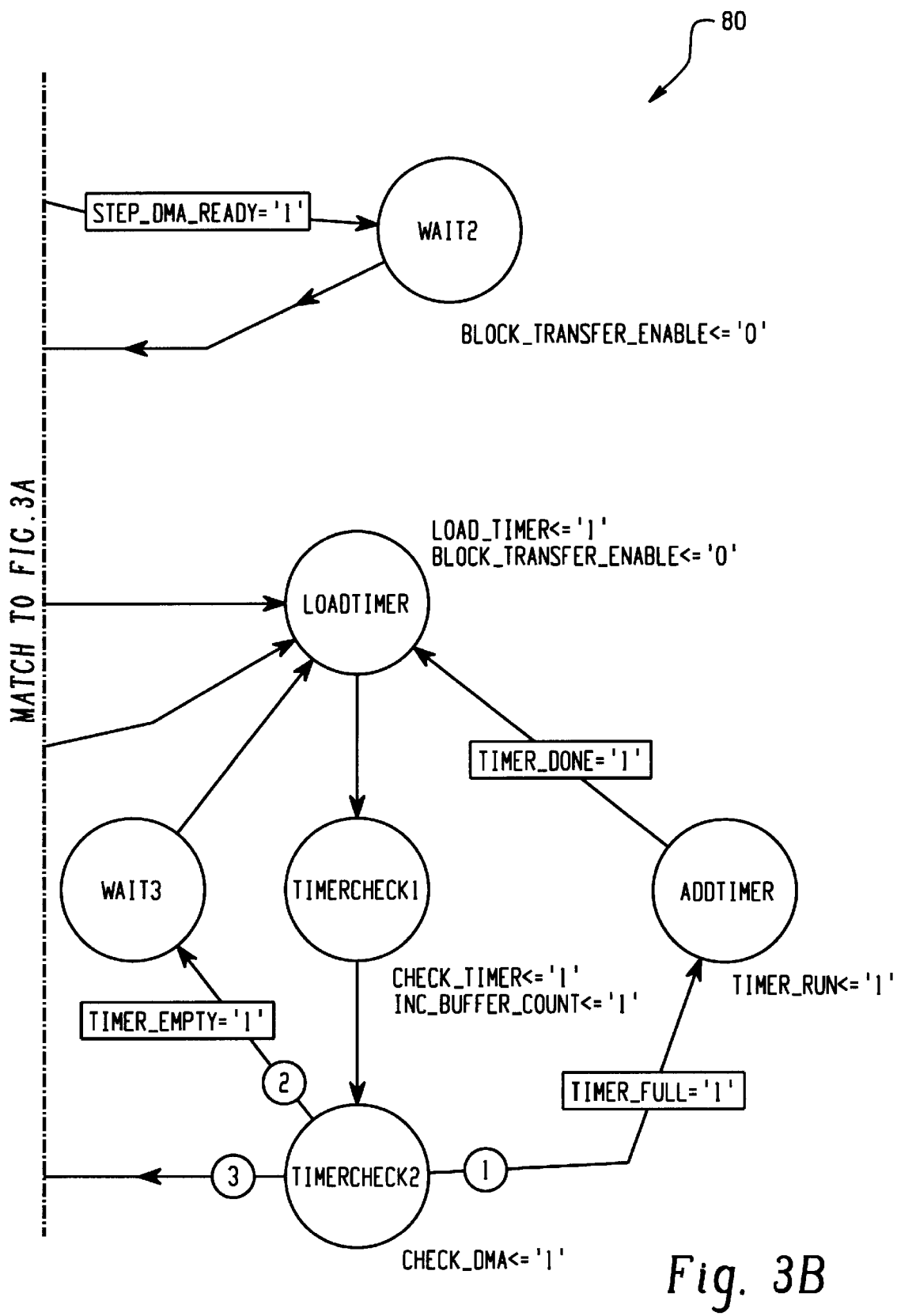
Figure 5:
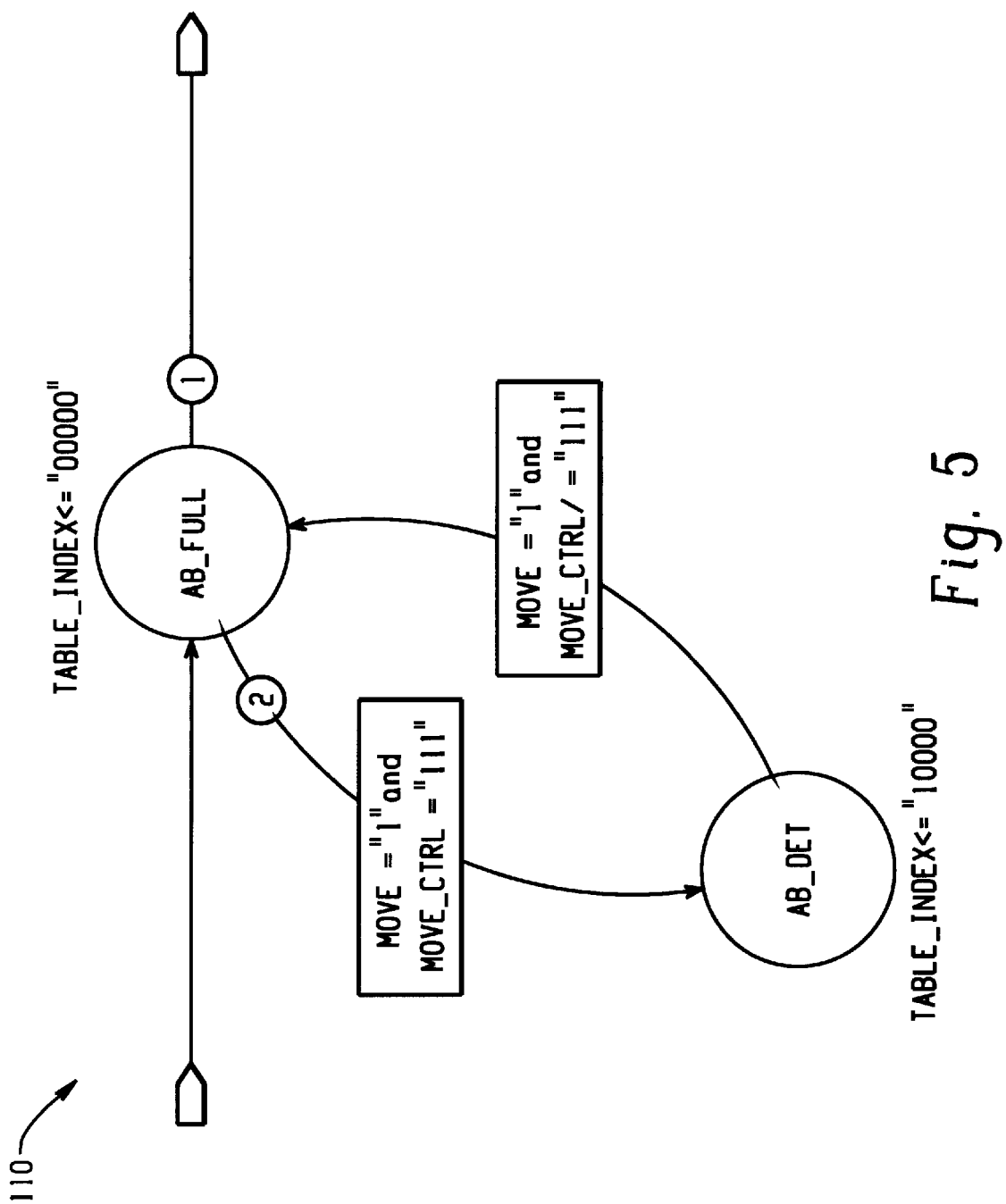
FIG. 5 is a more detailed state diagram for a given state of the diagram of FIG. 4.

Detailed explanation of controller operation is explained relative to the ASIC signals identified in FIG. 2, and with additional reference to FIGS. 3–5. FIG. 3 shows a state diagram 80 for control block 52. To initiate motor operation the control registers of control block 50 may first be loaded via microprocessor input (DATA_IN, WRITE, DEC_STEP) with desired control information, such as base timer data (bits 5:0 of register 58), the base value for the step counter 70 (bits 15:0 of register 60), the base value for the repeat counter 72 (bits 31:16 of register 60), the motor direction data (bit 1 of register 62), the count value for DMA access control (bits 11:0 of register 64), and a step count value for a step count interrupt source (bits 15:0 of register 66). When all desired control data is loaded the timer enable control bit (bit 0 of register 62) is loaded with a logic 1 value causing the control block 50 to set its TIMER_ENABLE output high. At this time the BUFFER_COUNT value (bits 13:12 of register 64) reflects a zero value (binary "00").

In response to TIMER_ENABLE being set high (as well as the DMA_COUNT output of control block 50 being non-zero and the MANUAL_OUTPUT output of control block 50 being zero) control block 52 moves from the IDLE state to the DMAREQ state where its SM_DMA_REQ output is set high and its BLOCK_TRANSFER_ENABLE output is set low. In response to the high SM_DMA REQ signal, control block 50 sets its STEP_DMA_REQ output high to trigger the DMA channel controller 76 to retrieve a first entry from one of tables 12A, 12B. Table 12A or 12B selection may be under microprocessor control. At the same time control block 50 moves to its WAIT1 state where it waits for a high input at its STEP_DMA_READY input. When the DMA controller 76 has loaded up an entry on the input bus DMA_DATA_IN the DMA controller 76 sets the STEP_DMA_READY input to control block 52 high. When the entry is loaded by DMA controller 76 the control block 50 inputs the entry to buffer 16 and decreases BUFFER_COUNT by two (2) resulting in a value of two (binary "10") in BUFFER_COUNT. The control block 52 moves to state WAIT2 and then on to the BUFFERCHECK state. In the BUFFERCHECK state BUFFER_COUNT is checked and because BUFFER_COUNT is not zero, control block 52 returns to state DMAREQ and SM_DMA_REQ is again set high. In response to the high SM_DMA_REQ signal, control block 50 sets its STEP_DMA_REQ output high to trigger the DMA channel controller 76 to retrieve a second entry from a table 12A, 12B. At the same time control block 50 moves to state WAIT1 where it again waits for a high input at its STEP_DMA_READY input. When the DMA controller 76 has loaded up the second entry on the input bus DMA_DATA_IN, the DMA controller 76 sets STEP_DMA_READY high. When the entry is loaded by the DMA controller 76, the control block 50 inputs the entry into buffer 18 and decreases BUFFER_COUNT by two (2) resulting in a value of zero in BUFFER_COUNT (binary "00"). The control block 52 moves to state WAIT2 and then on to the BUFFERCHECK state. In the BUFFERCHECK state BUFFER_COUNT is checked and because BUFFER_COUNT is now zero, control block 52 moves to the LOADTIMER state.

In the LOADTIMER state control block 52 sets its LOAD_TIMER output high and moves to the TIMERCHECK1 state where its CHECK_TIMER output is set high and its INC_BUFFER_COUNT output is set high. In response to the LOAD_TIMER high signal, control block 50 loads the first time data from buffer 16 into counter 32. In response to the INC_BUFFER_COUNT high signal control block 50 increments the BUFFER_COUNT value (bits 13:12 of register 64) by 1. In response to the CHECK_TIMER high signal, control block 50 checks the time data loaded into the counter 32 to determine whether it represents a full count (all binary 1's) or an empty count (all binary 0's). If the loaded time data is neither a full count nor an empty count, control block 52 moves to the TIMERACTIVE state where it sets its TIMER_RUN output high. In response to the TIMER_RUN high signal, the control block 50 initiates the count operation of the counter 32. When the count operation is completed the TIMER_DONE output of control block 50 is set high and the control block 52 moves to the TIMERDONE state where its TIMER_EXPIRED output is set high. The control block 52 then moves back to the LOADTIMER state (as long as TIMER_ENABLE remains high) to trigger the next LOAD_TIMER high signal and corresponding loading of the next piece of time data into the counter 32.

In response to receipt of the TIMER_EXPIRED output being set high, the control block 50 sets the appropriate motor control information at its MOVE_CTRL output and then sets its MOVE output high. In response to the high MOVE signal the control block 54 examines the motor control information at MOVE_CTRL and identifies and outputs an appropriate index value for the next desired state at its TABLE_INDEX output. A partial state diagram 100 for state machine 38 (control block 54) is shown in FIG. 4, with only three of the sixteen possible states being shown. The index values for a given state (AB) are reflected in the state diagram 110 of FIG. 5, with two possible index values existing for each state, one for the full current state (AB_FULL) and one for the lower, detent current state (AB_DET). The index value is a five bit data segment. The index value at TABLE_INDEX is received by the control block 50 and in response motor energization control data corresponding to the index value is retrieved from a table 42, 44, 56 and is output at STEP_OUT. STEP_OUT may be connected to the serial interface of an analog ASIC which drives the stepper motor.

Control block 50 monitors the BUFFER_COUNT value during automatic operation and initiates a DMA retrieval operation by setting STEP_DMA_REQ high each time BUFFER_COUNT is an even number (either binary 00 or binary 10). In this manner a next entry is retrieved from the motor movement table after the second piece of time data of each entry has been used. In particular, referring to FIG. 3, when the control block 52 moves to the TIMERCHECK2 state control block 52 sets its CHECK_DMA output high. In response to the high CHECK_DMA signal, control block 50 checks the BUFFER_COUNT value (bits 13:12 of register 64) and, if the value is even, control block 50 sets its STEP_DMA_REQ output high to cause the DMA controller 76 to load the next entry from the motor movement table up onto the input bus DMA_DATA_IN, and the entry is loaded by the control block 50 into the buffer which is not currently being used. The above sequence may continue until the end of the motor movement table 12A, 12B is reached, as determined by control block 50 by when counter 74 decrements to zero. At that time, the STEP_IRQ output of control block 50 is set to a value that indicates that the end of the motor movement table has been reached. This value is sent as an interrupt back to the microprocessor. The microprocessor may then responsively rewrite the timer enable data bit (bit 0 of register 62) to a zero value causing the automatic operation of the controller to stop.

Referring again to FIG. 3, the odd step number or step skipping technique described above is seen implemented in the logic of control block 52. In particular, in the TIMERCHECK2 state if the loaded time data represents an empty count, control block 50 sets its TIMER_EMPTY output high and control block 52 responsively moves to the WAIT3 state and then back to the LOADTIMER state for immediate loading of the next piece of time data. The implementation of the extended count technique for extending the duration between motor steps as described above is also shown. In particular, in the TIMERCHECK2 state if the loaded time data represents a full count then control block 50 sets its TIMER_FULL output high and control block 52 responsively moves to the ADDTIMER state where TIMER_RUN is set high to initiate the count operation in control block 50. At the conclusion of the count operation the TIMER_DONE output of control block 50 is set high and the control block 52 moves back to the LOADTIMER state without setting its TIMER_EXPIRED output high, thus preventing a step from being made.

A step repeat operation takes place when the control block 50 compares the step counter base value (bits 15:0 of register 60) to the count of the step counter 70. When the two are the same, the control block 50 enters its repeat mode and loads the repeat base value (bits 31:16 of register 60) into the repeat counter 72. Bit 2 of register 62 is also set high to indicate operation in the repeat mode. In the repeat mode the time data value in the counter 32 is repeatedly counted down by the counter 32 and at the conclusion of each count the control block 50 sets its TIMER_DONE output high and the control block 52 moves to the TIMERDONE state where its TIMER_EXPIRED output is set high. The control block 52 then moves back to the LOADTIMER state (as long as TIMER_ENABLE remains high) to trigger the next LOAD_TIMER high signal. However, because control block 50 is in the repeat mode (as indicated by bit 2 of register 62), control block 50 does not set its STEP_DMA_REQ output high in response to the high LOAD_TIMER signal. Thus, further retrieval of data from the table 12A or 12B is prevented during the repeat operation. In response to receipt of the TIMER_EXPIRED output being set high, the control block 50 sets the appropriate motor control information at its MOVE_CTRL output and then sets its MOVE output high. Control block 50 also responds to the TIMER_EXPIRED signal by decrementing the repeat counter 72. In response the MOVE signal from control block 50, the control block 54 examines the move control information and identifies and outputs an appropriate index value for the next desired state at its TABLE_INDEX output which control block 50 uses to output motor energization control data as previously explained. This sequence continues until the value in the repeat counter 72 reaches zero, at which time bit 2 of register 62 is again set low, and automatic operation with DMA retrieval resumes.

Figure 6A:
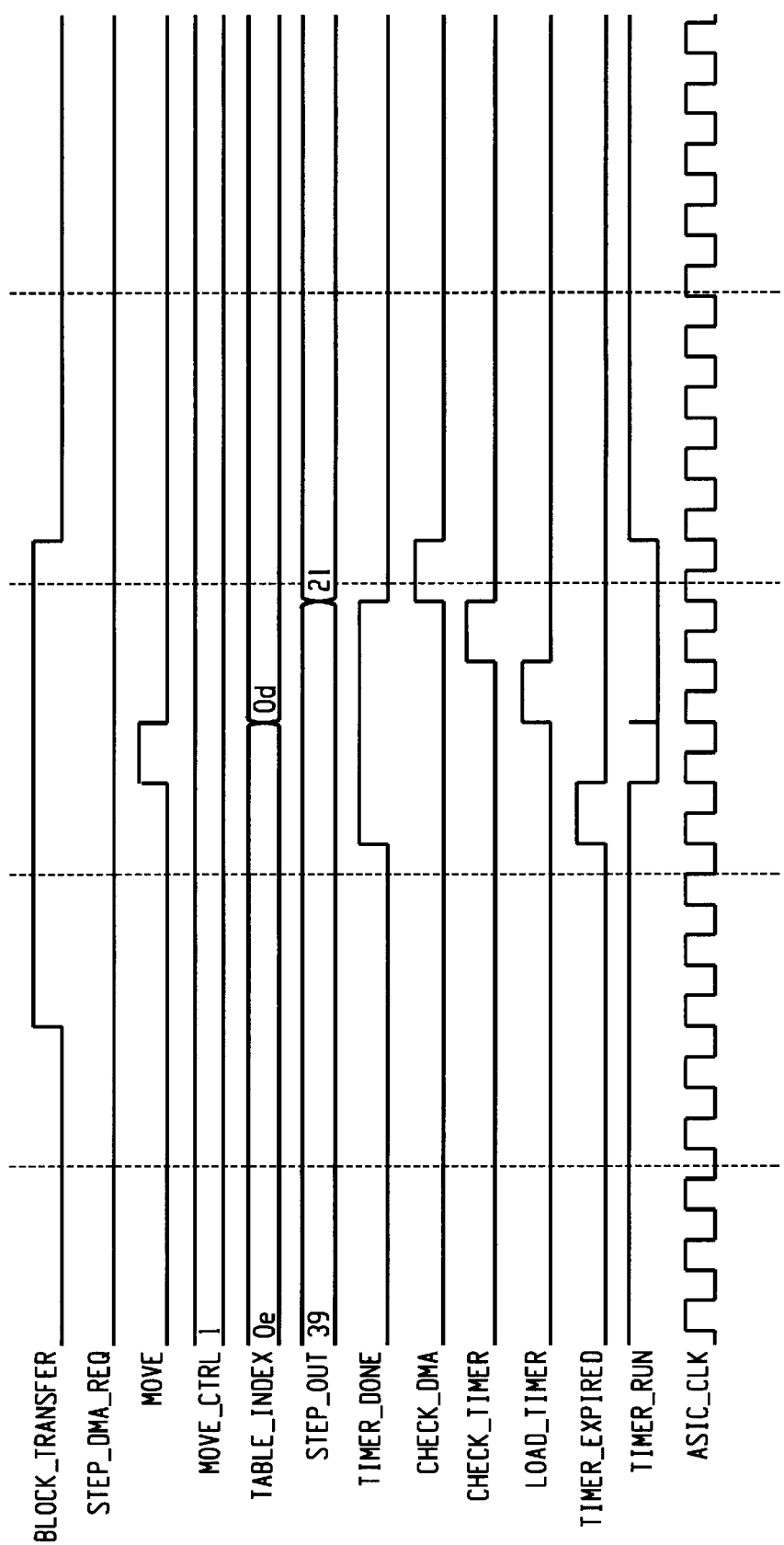
FIGS. 6A and 6B are signal timing diagrams for the control system embodiment of FIG. 2.
Figure 6B:
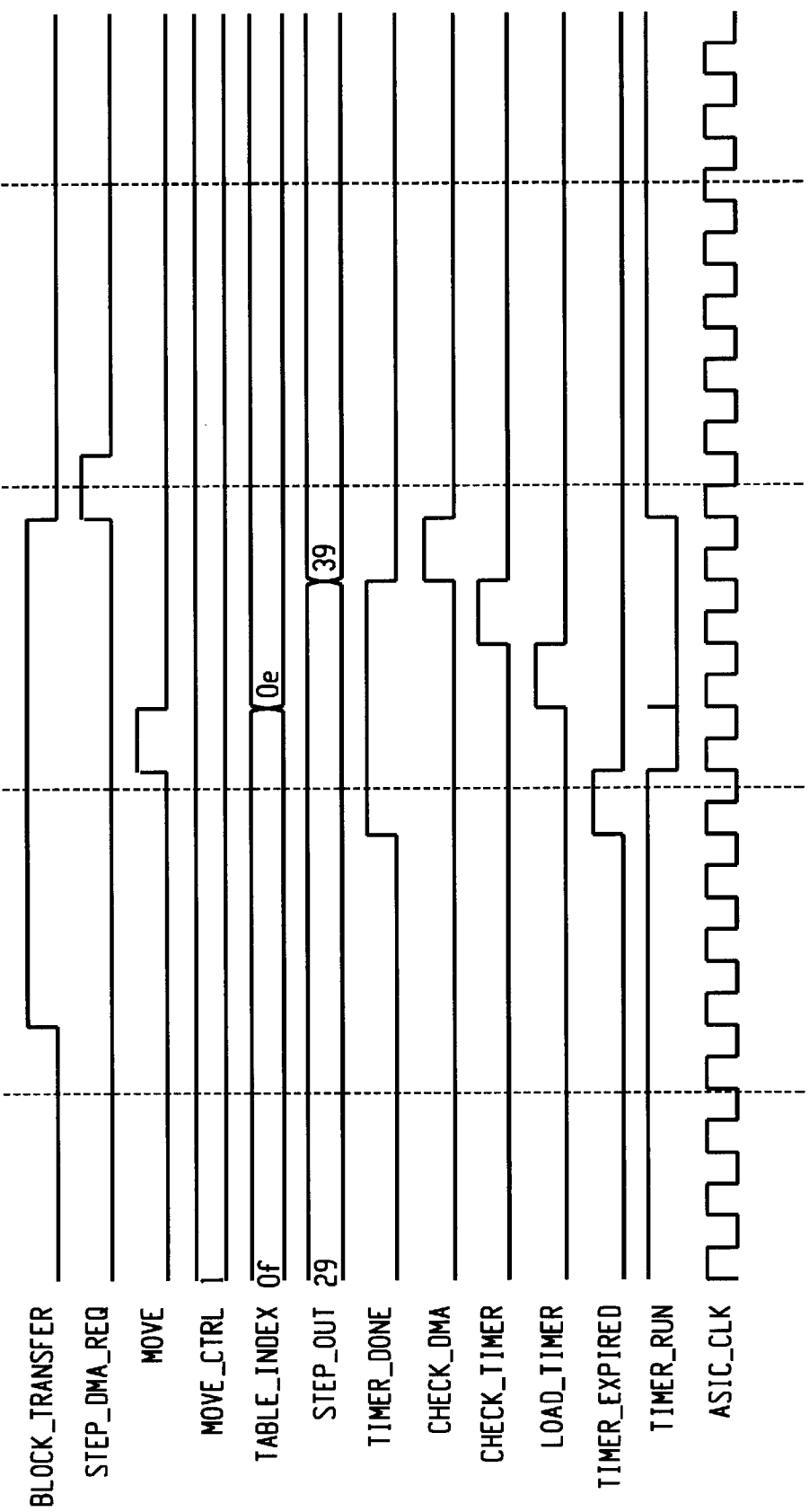

Referring now to FIGS. 6A and 6B, timing diagrams for various of the signals identified in FIG. 2 are shown in conjunction with the system clock signal (ASIC_CLK). FIG. 6A represents the timing diagram associated with a load and count operation of a first piece of time data from a given entry in one of tables 12A and 12B, while FIG. 6B represents the timing diagram associated with a load and count down operation of a second piece of time data for the same entry. As seen by comparison of the two timing diagrams, at the conclusion of the count associated with the first piece of time data, no request (STEP_DMA_REQ) for retrieval of the next entry in Table 12A or 12B is made (FIG. 6A), while at conclusion of the count associated with the second piece of time data, the request for the next table entry is made (FIG. 6B). Also observable in FIGS. 6A and 6B is the triggering of the BLOCK_TRANSFER signal shortly before the transition in the motor control output STEP_OUT is made.

Figure 7:
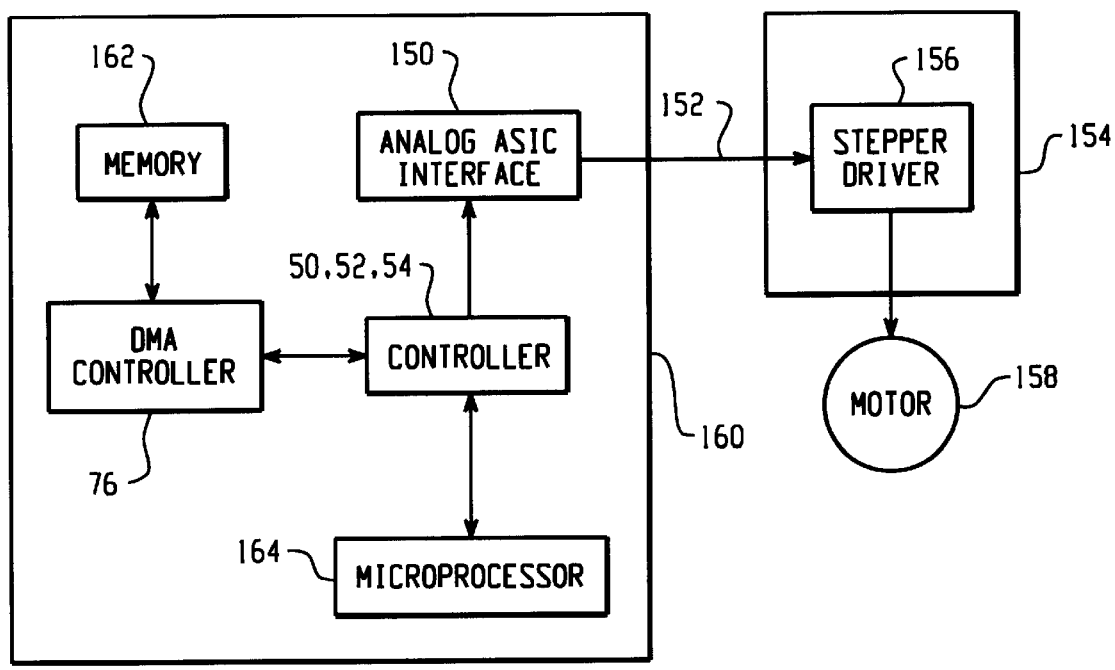
FIG. 7 is a high level control system diagram.

Referring now to FIG. 7, a high level schematic of the control system 10, including analog ASIC interface 150, serial bus 152, analog ASIC 154 with stepper driver 156, and motor 158 is shown. The digital ASIC 160 includes the interface 150, the controller 50, 52, 54, the DMA controller 76, memory 162 for storing tables 12A and 12B, and microprocessor 164.

Figure 8:
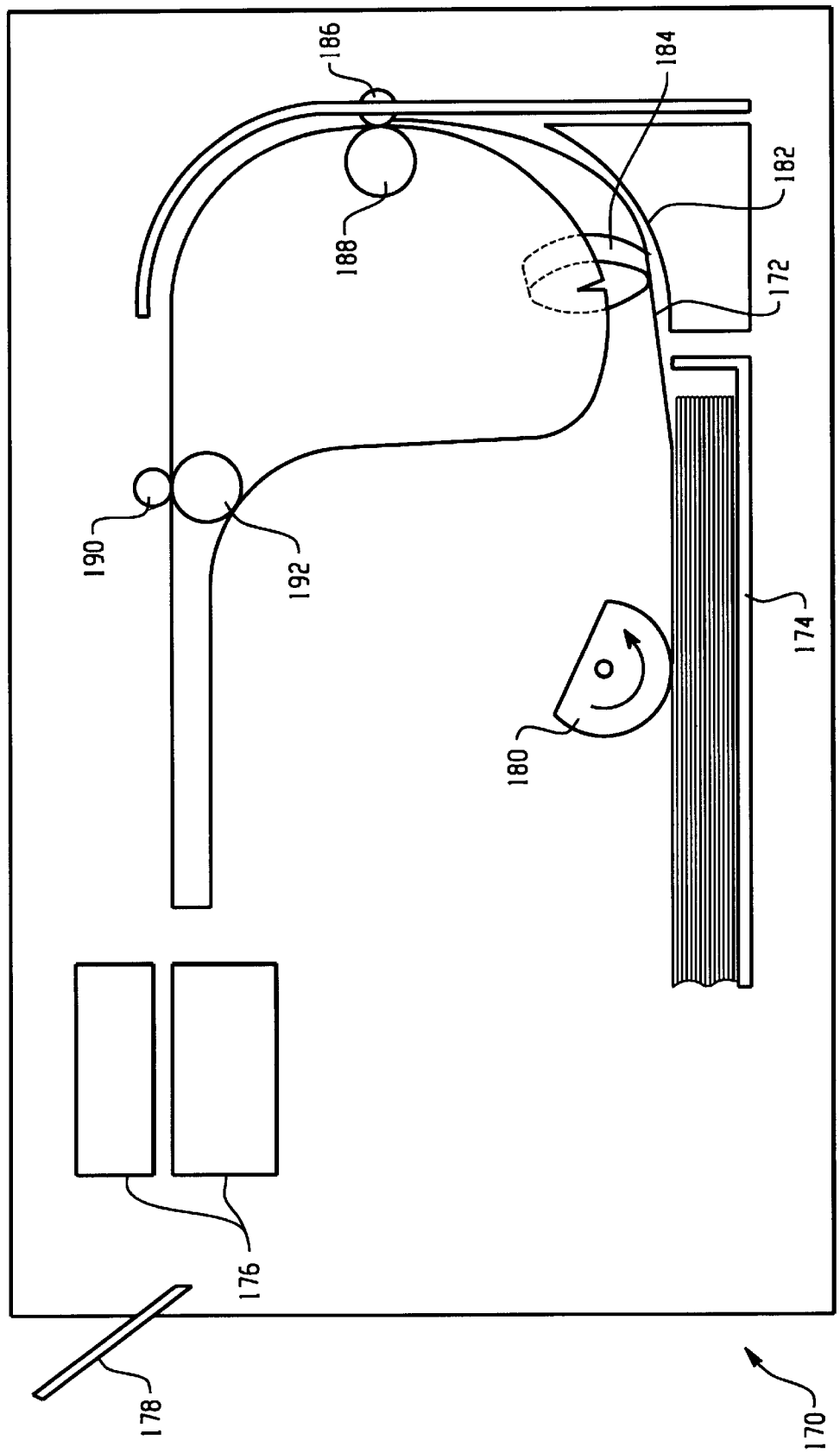
FIG. 8 depicts an exemplary media feed system that the stepper motor control system may be used to drive.

The described stepper motor control system may be used to drive a paper feed system of a printer or to drive a printhead carriage of a printer. An exemplary paper feed system of a printer is shown and described in U.S. Pat. No. 5,494,277. Such paper feed system is also shown in FIG. 8 now described with reference to FIG. 8. In particular, FIG. 8 shows a printer 170 having a sheet feed by which sheets 172, typically paper or laminations such as labels, are located in a lower tray 174, pass through printing mechanism 176 and then exit printer 170 to a tray 178, where they are accessible to an operator. To feed sheets 172, roller 180, widely termed a D roller, is rotated one revolution, as is conventional. Friction between roller 180 and the top sheet 172 moves sheet 172 out of tray 174 where it is guided upward by lower guide surface 182. Prior to encountering lower surface 182, sheet 172 encounters idler roller 184. Idler roller 184 may be mounted in a stationary position by brackets. Sheet 172 encounters nip rollers 186 and 188 and then nip rollers 190 and 192, each of which have a driven roller 188 and 192, respectively. Driven rollers 188 and 192 act as feed rollers to continue the feed of the sheet 172 through the printer. In this respect, the stepper motor 158 (FIG. 7) may be mounted in the printer housing and connected through a gear train to each of rollers 188 and 192 for controlling the sheet feed.

The following digital ASIC signal/line descriptions are applicable to the signals/lines identified in FIG. 2:

DATA_IN: An input to control block 50 for receiving data from a microprocessor or other processing device.

WRITE: An input to the control block 50 by which the microprocessor controls whether the data at DATA_IN is a request for information to be output at DSTEP, or a command to write information to one of the ASIC registers.

DEC_STEP: An input to control block 50 by which the microprocessor selects where data should be written in the ASIC registers of the control block.

DMA_DATA_IN: A DMA input channel of control block 50 for inputting data entries from a motor movement table 12A, 12B.

DMA_COUNT: An output from control block 50 to control block 52 which indicates the number of entries that are left in the motor movement table which is currently being used.

TIMER_FULL: An output from control block 50 to control block 52. A high output indicates that the last loaded time data was a full count (all binary 1's).

TIMER_EMPTY: An output from control block 50 to control block 52. A high output indicates that the last loaded time data was an empty count (all binary 0's).

TIMER_DONE: An output from control block 50 to control block 52. This is a signal generated by the counter 32 indicating that count has reached zero.

TIMER_ENABLE: An output from control block 50 to control block 52. This output acts as an ON/OFF switch for the automatic operation of the controller.

BUFFER_COUNT: An output from control block 50 to control block 52. A 2 bit value that indicates the status of the filling of the buffers 16 and 18. DMA read in of motor movement table entries will continue under control of control block 52 until BUFFER_COUNT goes to zero.

MANUAL_OUTPUT: An output from control block 50 to control block 52. A control bit which is used when manual, rather than automatic operation is desired.

STEP_IRQ: An output from control block 50 to the microprocessor. This data signal is a 2 bit interrupt vector back to the microprocessor. One interrupt indicates that the end of the motor movement table has been reached, the other interrupt indicates that a certain point in the motor movement table has been reached.

MOVE_CTRL: An output from control block 50 to control block 54. A 3 bit segment of move control data that tells the state machine what type of step to take (full, half or quarter in either direction and detent).

MOVE: An output from control block 50 to control block 54. This output triggers the state machine to output the index value for the next state defined by the move called for in MOVE_CTRL.

BLOCK_TRANSFER: An output from control block 50 to the serial interface with an analog ASIC which effects motor operation. When the counter 32 is a predetermined number of counts away from zero, this output flag is sent to the serial interface to prevent the interface from sending updates to the analog ASIC so that the interface is available when the STEP_OUT data is sent.

STEP_OUT: An output from control block 50 to the serial interface with an analog ASIC which effects motor operation. Motor energization data from one of tables 42, 44, 56 is output to implement the next motor step.

DSTEP: An output from control block 50 to the microprocessor for transferring data to the microprocessor when requested by microprocessor.

STEP_DMA_REQ: An output from control block 50 to a DMA channel controller. This signal causes the DMA controller to retrieve the next data entry from the motor movement table 12A, 12B.

STEP_DMA_READY: An output from the DMA channel controller to control block 52 which indicates that a data entry is on the bus and is ready to be taken by control block 50.

BLOCK_TRANSFER_ENABLE: An output from control block 52 to control block 50. This signal is used to prevents BLOCK_TRANSFER from going high at undesired times such as when the system is first starting up.

INC_BUFFER_COUNT: An output from control block 52 to control block 50. This signal tells control block 50 that another piece of time data has been loaded into the counter 32, helping to synchronize when to go to the next buffer and/or request another data entry from the motor movement table.

LOAD_TIMER: An output from control block 52 to control block 50. This signal tells control block 50 to get the next piece of time data out of the buffer and load it into the counter 32.

CHECK_TIMER: An output from control block 52 to control block 50. This signal tells control block 50 that a new piece of time data was loaded into the counter 32 and should be checked for full count (all binary 1's) or empty count (all binary 0's).

TIMER_EXPIRED: An output from control block 52 to control block 50. This signal tells control block 50 that the count in counter 32 has reached zero and it is a valid time to take the next steps required to make a move.

SM_DMA_REQ: An output from control block 52 to control block 50. This signal is used to load the initial two data entries into the buffers 16, 18 by feeding into control block 50 and triggering the STEP_DMA_REQ output.

CHECK_DMA: An output from control block 52 to control block 50. This signal tells control block 50 to see if it is near the end of the motor movement table.

TIMER_RUN: An output from control block 52 to control block 50. This signal controls operation of the counter 32 in control block 50 by initiating its counting operation.

TABLE_INDEX: An output from control block 54 to control block 50. This index value corresponds to the next desired state of the motor and is used to output motor energization data from one of tables 42, 44, and 56.

Figure 9:
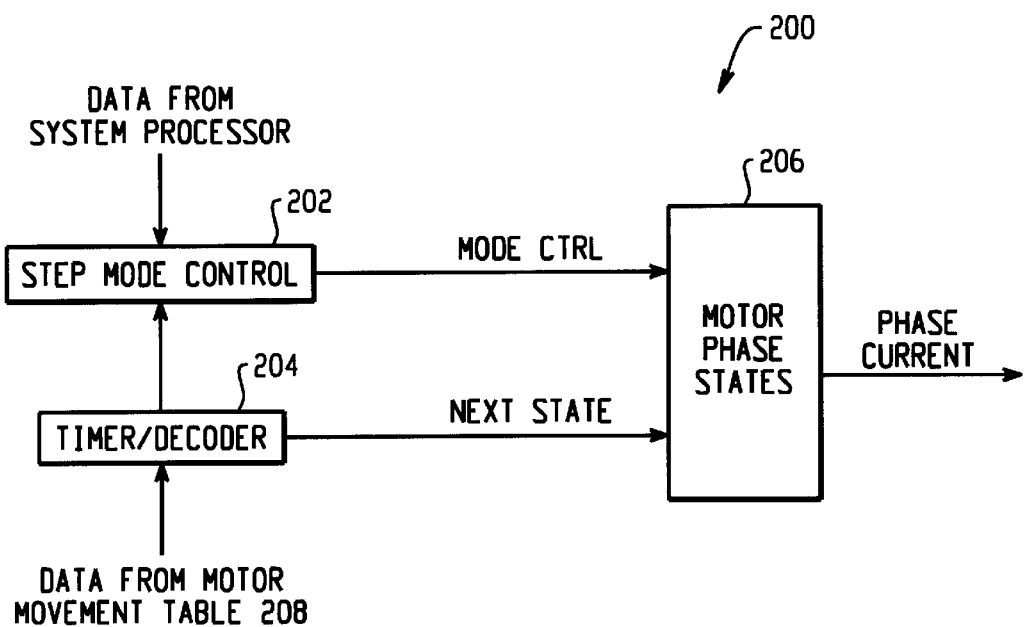
FIG. 9 is a schematic of an alternative embodiment of a stepper motor control system.

While in the embodiment illustrated above all entries in the motor movement table include step mode selection data, two pieces of time data, and energization table selection data, it is recognized that variations are possible. In particular, systems in which only a single piece of time data is included in each entry of the motor movement table are contemplated. Further, systems in which only some of the entries of the motor movement table include step mode selection data are contemplated. For example, referring now to FIG. 9, a system 200 is shown which includes a step mode control block 202, a timer/decoder block 204 and motor phase state control block 206. A motor movement table 208 contains multiple entries. The entries may contain time data only, but some entries may also contain control data such as step mode selection data, energization table selection data, interrupt data, or detent control data. The step mode control block 202 may receive control data from a processor and pass that information onto the motor phase state control block 206 in the form of mode control data, and the timer/decoder may receive time data from the table 208 for initiating timing operations which are used to trigger the motor phase state control block 206 to move on to the next energization state. Because some entries of the table 208 may contain control information, the timer/decoder 204 first examines a bit segment of each retrieved entry that can be used to identify those entries that contain control data. For example, in a system using 32 bit entries those entries containing only time data may contain two 16 bit time data segments. The timer/decoder examines the higher 16 bits of each retrieved entry and if the 16 bit segment matches a predetermined value, e.g. 0xffff, then the timer/decoder interprets the lower 16 bits of that entry as control data. The new control data is sent to the step mode control block 202 to update the control parameters in the motor phase state control block 206. In this manner changes to the stepping mode, motor direction, and energization table selection can be made via data entered in the motor movement table rather than only from the processor. Those entries that contain only two pieces of time data can simply be used to set two timing operations for energizing the stepper motor.

Although the invention has been described above in detail referencing the preferred embodiments thereof, it is recognized that various changes and modifications could be made without departing from the spirit and scope of the invention.

What is claimed is:

1. A method for controlling a stepper motor, comprising the steps of:
   (a) storing a motor movement table having a plurality of entries, a multiplicity of said entries storing step mode selection data, time data, and energization table selection data;
   (b) providing at least two stored motor energization tables;
   (c) retrieving from said motor movement table a first entry;
   (d) initiating a count according to time data of the first entry;
   (e) after conclusion of the count of step (d), and based in part upon the step mode selection data of the first entry, establishing move control data for defining a desired next state;
   (f) based at least in part upon the move control data established in step (e), establishing an energization table index value corresponding to the desired next state; and
   (g) accessing a motor energization table corresponding to the table selection data of the first entry, and outputting from the accessed table motor energization control data corresponding to the energization table index value of step (f).

2. The method of claim 1 comprising the further step of energizing the stepper motor in accordance with the motor energization control data output in step (g).

3. The method of claim 1 comprising the further steps of:
   (h) retrieving from the motor movement table a second entry;
   (i) initiating a count according to time data of the second entry;
   (j) after conclusion of the count of step (i), and based in part upon the step mode selection data of the second entry, establishing next move control data for defining a next desired next state;
   (k) based at least in part upon the next move control data established in step (j), establishing a next energization table index value corresponding to the next desired next state;
   (l) accessing a motor energization table corresponding to the table selection data of the second entry, and outputting from the accessed table next motor energization control data corresponding to the next energization table index value of step (k).

4. The method of claim 3 wherein the motor energization table accessed in step (l) and the motor energization table accessed in step (g) are the same.

5. The method of claim 1 wherein the multiplicity of said motor movement table entries also store detent control data.

6. A method for controlling a stepper motor, comprising the steps of:
   (a) storing a motor movement table having a plurality of entries, a multiplicity of said entries storing step mode selection data, first time data, and second time data;

(b) retrieving from said motor movement table a first entry;

(c) initiating a first count according to the first time data of the first entry;

(d) after the first count is concluded, and based in part upon the step mode selection data of the first entry, establishing first move control data indicative of a first desired next state;

(e) based at least in part upon the first move control data, establishing a first table index value corresponding to the first desired next state;

(f) accessing a motor energization table and outputting from the accessed table first motor energization control data corresponding to the first table index value;

(g) after the first count is concluded, initiating a second count according to the second time data of the first entry;

(h) after the second count is concluded, and based in part upon the step mode selection data of the first entry, establishing second move control data indicative of a second desired next state;

(i) based at least in part upon the second move control data, establishing a second table index value corresponding to the second desired next state;

(j) accessing the motor energization table and outputting from the accessed table second motor energization control data corresponding to the second table index value.

7. The method of claim 6 wherein a determination is made as to whether the first time data represents a full count and, if so, skipping steps (d), (e) and (f).

8. The method of claim 6 wherein a determination is made as to whether the first time data represents a zero count and, if so: (i) skipping steps (c), (d), (e), (f) and (g), (ii) immediately initiating a second count according to the second time data of the first entry, and (iii) proceeding with steps (h), (i) and (j).

9. A method for controlling a stepper motor, comprising the steps of:

(a) storing in memory a motor movement table having a plurality of entries, a multiplicity of said entries storing step mode selection data, first time data, second time data, detent control data, and energization table selection data;

(b) providing at least two motor energization tables stored in registers of a digital ASIC;

(c) providing a state machine in the digital ASIC for outputting energization table index values;

(d) retrieving from said motor movement table a first entry and placing the entry in a buffer of the digital ASIC;

(e) loading the first time data of the first entry into a counter of the digital ASIC and initiating a first count;

(f) after conclusion of the first count, and based in part upon the step mode selection data of the first entry, providing move control data to the state machine for defining a first desired next state, the move control data including step mode data and direction data;

(g) based upon the move control data of step (f) and a previous state, outputting from the state machine a first table index value corresponding to the first desired next state;

(h) accessing a motor energization table corresponding to the table selection data of the first entry, and outputting first motor energization control data corresponding to the first table index value;

(i) upon conclusion of the first count, loading the second time data into the counter and initiating a second count;

(j) after conclusion of the second count, and based in part upon the step mode selection data of the first entry, providing move control data to the state machine for defining a second desired next state, the move control data including step mode data and direction data;

(k) based upon the move control data of step (j) and a previous state, outputting from the state machine a second table index value corresponding to the second desired next state; and (l) accessing the motor energization table corresponding to the table selection data of the first entry, and outputting second motor energization control data corresponding to the second table index value.

10. The method of claim 9 wherein in step (e) a determination is made as to whether the first time data represents a full count and, if so, skipping steps (f), (g) and (h).

11. The method of claim 9 wherein in step (e) a determination is made as to whether the first time data represents a zero count and, if so, skipping steps (e), (f), (g), (h) and (i), immediately loading the second time data of the first entry into the counter and initiating a second count, and proceeding with steps (j), (k) and (l).

12. The method of claim 9 wherein in step (d) the first entry is loaded into a first buffer, and the method involves the further step of:

(m) retrieving from said motor movement table a second entry and placing the entry in a second buffer of the digital ASIC;

(n) upon conclusion of the second count, loading the first time data of the second entry into the counter and initiating a third count;

(o) after conclusion of the third count, and based in part upon the step mode selection data of the second entry, providing next move control data to the state machine for defining a third desired next state, the next move control data including step mode data and direction data;

(p) based upon the next move control data and a previous state, outputting from the state machine a third table index value corresponding to the third desired next state;

(q) accessing a motor energization table corresponding to the table selection data of the second entry, and outputting third motor energization control data corresponding to the third table index value.

13. The method of claim 12, further comprising the step of: (r) in response to use of the first entry being completed, retrieving from said motor movement table a third entry and placing the entry in the first buffer of the digital ASIC.

14. The method of claim 9 wherein in steps (h) and (l) motor energization control data is output to a serial interface unit for delivery to an analog ASIC which drives the stepper motor, and for a defined time period prior to outputting motor energization data, a block transfer signal is sent from the digital ASIC to the serial interface unit for preventing the interface unit from sending other data to the analog ASIC.

15. A method for controlling a stepper motor, comprising the steps of:

(a) storing a motor movement table having a plurality of entries, a multiplicity of said entries storing both first time data and second time data;

(b) retrieving from said motor movement table a first entry;
(c) initiating a first count according to the first time data of the first entry;
(d) after the first count is concluded, outputting first motor energization control data;
(e) after the first count is concluded, initiating a second count according to the second time date of the first entry;
(f) after the second count is concluded, outputting second motor energization control data;
(g) after step (b), determining whether the first time data represents a full count and, if so, skipping step (d).

16. The method of claim 15 comprising the further step of:
(h) after step (b), determining whether the first time data represents a zero count and, if so: (i) skipping steps (c), (d) and (e), (ii) immediately initiating a second count according to the second time data of the first entry, and (ii) proceeding with steps (f) and (g).

17. A paper feed system for a printer, comprising:
a paper feed roller;
a stepper motor operatively connected for effecting rotation of the paper feed roller;
a stepper motor control system including:
  memory storing a motor movement table having a plurality of entries, a multiplicity of said entries storing step mode selection data, first time data, second time data, detent control data, and energization table selection data;
  a digital control block including a buffer for receiving a retrieved entry from the motor movement table, a counter for receiving time data from the retrieved entry in the buffer and initiating a count operation, at least two motor energization tables stored in ASIC registers for outputting motor energization control data;
  a digital state machine for outputting an energization table index value to the digital control block;
  wherein the digital control block includes an output for delivering, upon conclusion of the count operation, and based in part upon the step mode selection data of the retrieved entry, move control data to the digital state machine for determining a desired next state, the move control data including step mode data and direction data;
  wherein in response to receipt of the move control data the digital state machine outputs a next state index value to the digital control block; and
  wherein in response to receipt of the next state index value the digital control block accesses a motor energization table corresponding to the table selection data of the retrieved entry, and outputs motor energization control data corresponding to the next state table index value.

18. A paper feed system for a printer, comprising:
a paper feed roller;
a stepper motor operatively connected for effecting rotation of the paper feed roller;
a stepper motor control system including:
  memory storing a motor movement table having a plurality of entries, a multiplicity of said entries storing at least step mode selection data, time data, detent control data, and energization table selection data;
  a controller operable to access the motor movement table and initiate a count based upon the time data of a retrieved entry, the controller further operable upon completion of the count to establish an energization table index value based at least in part on the step mode selection data of the retrieved entry, the controller further operable to access an energization table corresponding to the energization table selection data of the retrieved entry, and the controller operable to output motor energization control data from the accessed energization table in accordance with the energization table index value.

19. The system of claim 18 wherein the step mode selection data of each of said multiplicity of entries comprises at least two bits of data for selectively designating at least a quarter step mode, a half step mode and a full step mode of the stepper motor.

20. A method for controlling a stepper motor, comprising the steps of:
(a) storing a motor movement table having a plurality of entries, a multiplicity of said entries storing time data only, at least one entry storing motor control data;
(b) for each entry retrieved from the motor movement table:
  (i) comparing a bit segment of the entry to a predetermined value;
  (ii) if the examined bit segment matches the predetermined value, treating another bit segment of the entry as control information and adjusting control of the motor accordingly;
  (iii) if the examined bit segment does not match the predetermined value, treating data within the entry as time data and initiating a timing operation based upon such data for timing motor energization.

* * * * *